Patented July 15, 1952

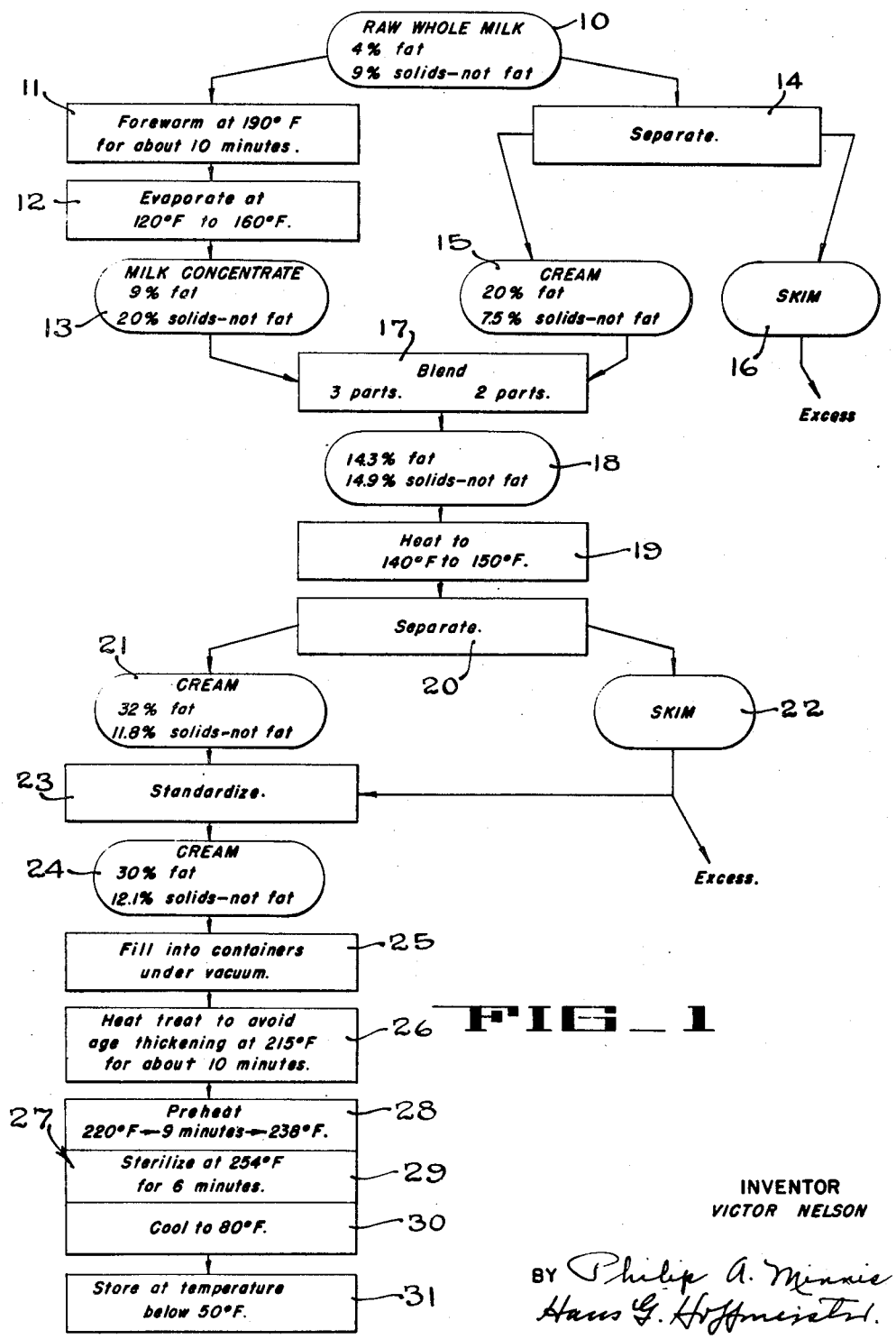

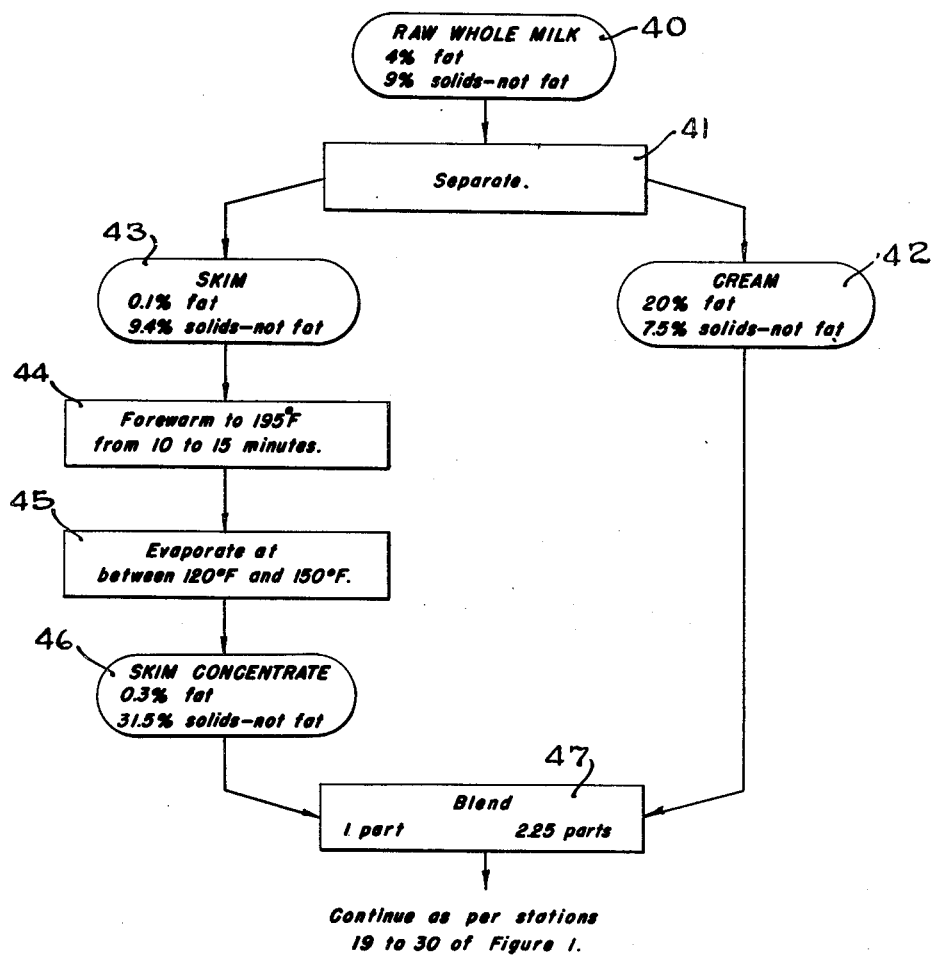
FIG_2

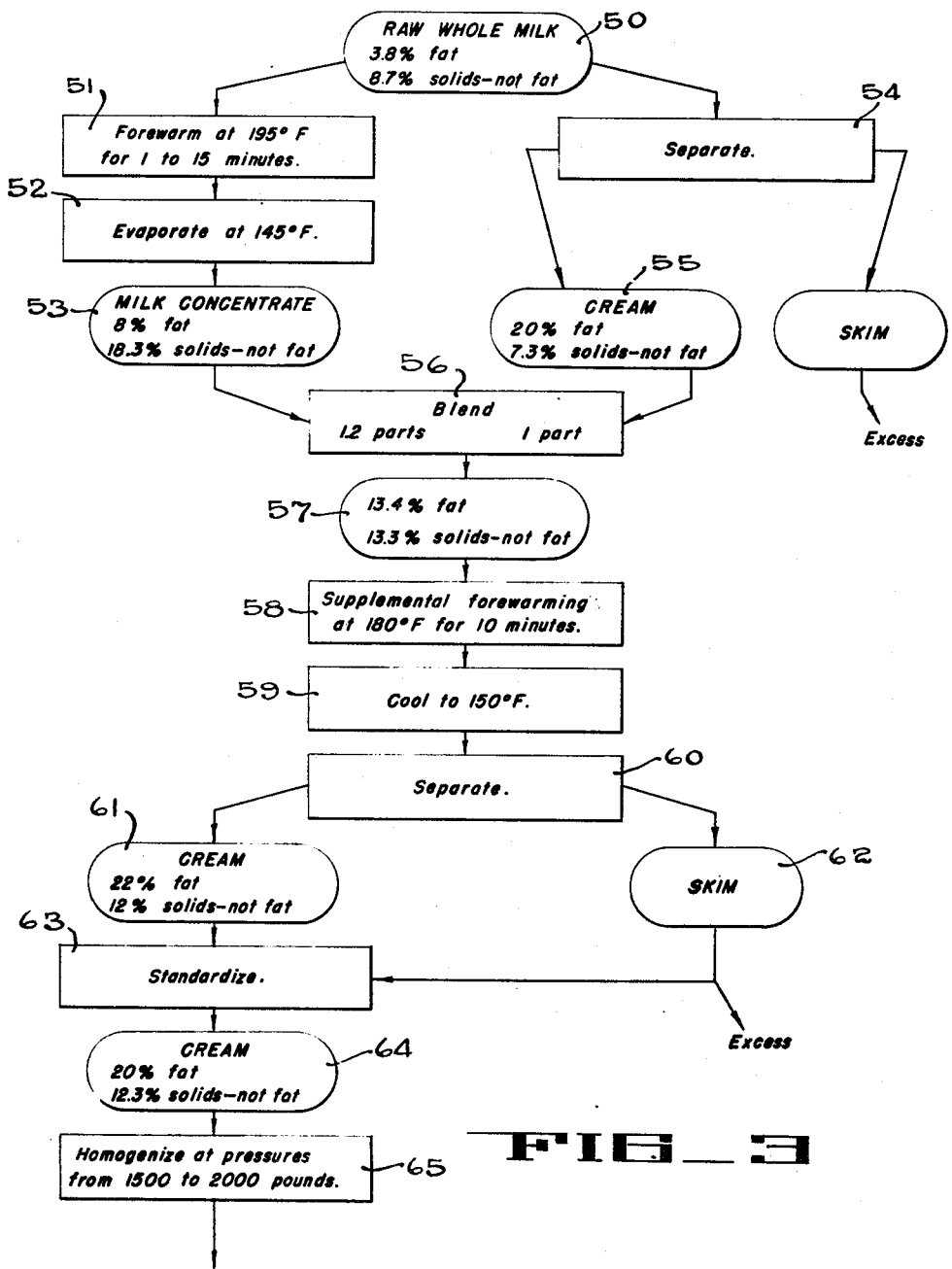

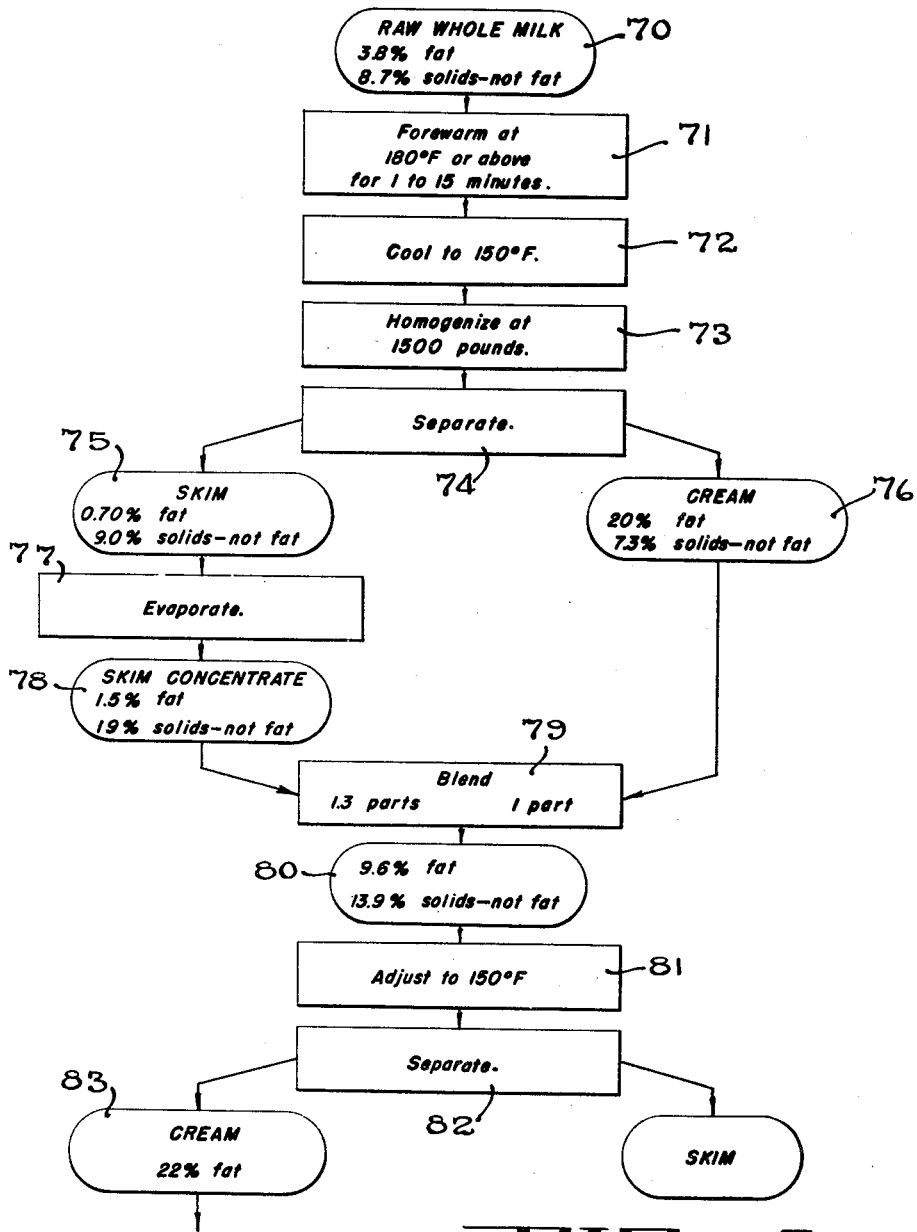

2,603,568

UNITED STATES PATENT OFFICE 2,603,568

PROCESS FOR PREPARING A STERILIZED CREAM FOR PRESERVATION IN SEALED CONTAINERS

Victor Nelson, San Jose, Calif., assignor to Food Machinery and Chemical Corporation, San Jose, Calif., a corporation of Delaware Application April 7, 1948, Serial No. 19,447

7 Claims. (Cl. 99—60)

The present invention relates to methods for the manufacture of sterilized cream. More particularly the invention relates to methods for the manufacture of sterilized cream that may be preserved in sealed containers over extended periods of time.

For preserved cream to find public acceptance it is necessary that it closely resembles freshly pasteurized cream in appearance and palatability at the time of consumption. However, the task of treating cream in a manner that will enable it to withstand the rigors of long storage or transportation without impairment of its quality presents many problems of a complex inter-relation in that factors which are of beneficial influence is some respects, may be of adverse effect in other directions. One of the main problems in the preservation of cream is fat separation; that is to say, the fat globules of the cream rise to the upper region of the container and form a compact layer of fat while the serum gathers in a liquid layer below. Although this tendency may be retarded by a process known as homogenization which reduces the size of the individual fat globules and thus minimizes their buoyancy, this procedure impairs the heat stability of the product and may cause coagulation at the high temperatures of the subsequent sterilization process. In addition, homogenization practically destroys the whipping quality of cream and this quality is most desirable in creams of high fat content which are the very creams that exhibit the greatest tendency toward fat separation. Furthermore, while it is necessary to expose canned cream to high temperatures so as to render it dependably sterile, such temperatures tend to produce an objectionable cooked flavor and frequently cause discoloration of the preserve during the sterilization process and later during storage.

It is an object of the present invention to provide a sterilized cream for preservation in sealed containers, such as cans, that will retain the appearance and palatability of freshly pasteurized cream over extended periods of time.

More particularly, it is an object of the present invention to provide a sterilized cream of purely milk origin which is adapted to retain its original appearance and palatability over extended periods of time without the aid of additives foreign to milk.

It is a specific object of the present invention to provide a sterilized cream for preservation in sealed containers that effectively resists fat separation over extended periods of storage without homogenization and without foreign additives of any kind.

Furthermore, it is an object of the present invention to provide a sterilized whipping cream for preservation in sealed containers which, while adapted to resist fat separation, is of excellent whipping quality and retains this quality for a practically unlimited period of time.

Another object of the present invention is to furnish a method for preparing a sterilized cream in such a manner as to effectively inhibit fat separation during subsequent storage.

Moreover, it is an object of the invention to furnish a method for preparing and canning a cream in sealed containers in such a manner as to materially retard discoloration of the canned product during storage.

Additionally it is an object of the invention to furnish a method of preparing and canning a cream in sealed containers in such a manner that no tallowy flavors will develop.

These and other objects of the present invention will be apparent from the following description of the accompanying drawings in which Figs. 1 to 4, inclusive, illustrate specific exemplary embodiments of my novel process in the manner of flow charts.

I have found that a cream compounded in such a manner as to be abnormally rich in solids-not-fat, lends itself especially well for preservation in sealed containers. When properly pretreated in accordance with the present invention, it will retain a flavor, color, and texture that closely approaches freshly pasteurized cream and will be especially resistant to fat separation. While I am unable to state with certainty in which manner the described composition enhances the keeping quality of the canned product and prevents fat separation thereof, I believe one of the factors to be the resultant increase in the viscosity of the cream serum which impedes the buoyancy of the fat globules and thus prevents them from gathering in the upper portion of the can. High degrees of homogenization with their adverse effects upon the heat stability of milk products are thus rendered unnecessary and, if desired, the fat globules of the cream may be retained in relatively large sizes which has the added advantage of preserving the whipping quality of the canned product.

As an additional step in preparing a cream that will retain the flavor, palatability, and appearance of fresh cream over prolonged periods of storage, I so arrange the production process of said cream that while part of the milk composition from which the cream is eventually separated is subjected to a carefully controlled forewarming process to increase its heat stability, the greater portion of the fat contained in the final product is added to the composition in a natural or pasteurized condition prior to the final separation process. This imparts a natural cream aroma to the canned product that endures over a remarkably long period of time. In addition, it aids in preventing tallowy flavors and takes a significant part in the prevention of fat separation.

While I have verified the beneficial effects of the described process step by numerous tests, I am again unable to state with certainty the specific occurences which are responsible for the results obtained. As regards milk coagulation in general, I believe that the disintegration of the whey proteins normally contained in milk forms reducing compounds, such as, sulphur compounds, which act as powerful coagulants. In my opinion, the effectiveness of "forewarming" in raising the heat stability of milk is partly due to the fact that this process accelerates the formation of said coagulants at a permissible rate and thus causes them to escape harmlessly whereas they would cause coagulation if suddenly released in large quantities by the high temperatures of the sterilization process while the milk product is enclosed in sealed containers. Having specific reference to the present invention, I believe that the reintroduction, into the product, of a measured amount of the dormant coagulants, ordinarily eliminated by the forewarming process, is instrumental in creating limited local coagulation phenomena which cause the fat globules to gather in loose clusters that counteract fat separation and increase the apparent viscosity of the cream.

Furthermore, I believe that the limited quantity of reducing compounds released under the heat of the sterilizing process by the undenatured whey proteins, introduced into the composition with the non-forewarmed cream, bind any oxygen that may have remained in the cans, and thus prevent oxidation of the cream fat which is primarily responsibe for the development of tallowy flavors during storage.

In the accompanying drawings, wherein all percentages are given in percent by weight, Fig. 1 illustrates diagrammatically the production process of the invention for the manufacture of a whipping cream. The process proceeds from a whole milk which may contain 13% of solids composed of 4% of fat and 9% of solids-not-fat, as stated in oval 10 at the top of the chart Fig. 1. It should be understood that any high grade milk may be employed with equal success and will only require slight adjustments in the degree of the subsequently described evaporation, separation, and/or blending process depending upon its exact content of fat and solids-not-fat. A quantity of the milk 10 is heated in a suitable container, such as a steam jacketed kettle, to a temperature between 180° and 210° F. for an adequate period of time to increase its heat stability such that the final product may withstand the high temperatures of the subsequent sterizilation process without coagulation.

In the particular process illustrated in Fig. 1 the exact temperature employed at this stage is given in block 11 as 190° F., but in practice the most favorable temperature will vary within the above stated limits depending upon the character of the selected raw milk and the temperatures employed in the subsequent sterilization process, and while ordinarily an exposure of about 10 minutes will suffice to properly stabilize the product, it will be understood that the optimum period is likewise subject to variations depending upon the character of the raw material and the temperatures involved in the sterilization process; and in practice the most effective temperature and time of exposure is preferably determined by a series of pilot tests.

After the described heat treatment the milk is passed into a suitable evaporator, represented by the block 12, wherein about half of the water may be removed at temperatures ranging preferably from about 120° F. to 160° F. to raise the content of solids in the resultant concentrate to 29% composed of 9% of fat and 20% of solids-not-fat, as indicated in oval 13.

Another lot of the selected raw milk has meanwhile been processed in a suitable separator, represented by the block 14, to recover a raw cream containing, say 20% of fat and 7.5% of solids-not-fat, as indicated by the oval 15, the major portion of the original quantity of solids-not-fat being retained in the skim (oval 16) which results from the separation process 14.

As the next step in the process of the invention quantities of the heat-treated milk concentrate 13 and of the raw cream 15 are blended in a suitable mixer in such proportion as to enable a subsequent separation process to yield a whipping cream combining a desired fat content with at least 10% of solids-not-fat, with the latter ranging preferably from ⅓ to ⅔ of the content in fat. In the exemplary embodiment of the invention illustrated in Fig. 1, the forewarmed milk concentrate 13 was shown to contain 9% of fat and 20% of solids-not-fat and the raw cream 15 was shown to contain 20% of fat and 7.5% of solids-not-fat. Therefore, to eventually obtain a cream having a fat content of 30% or more and a content of solids-not-fat of at least ⅓ of the stated percentage of fat, three parts of the milk concentrate 13, say 23 pounds, are blended with two parts, i. e., 16 pounds of the raw cream 15, as indicated in block 17, yielding 39 pounds of a mixture containing 14.3% of fat and 14.9% of solids-not-fat, as stated in oval 18.

This mixture may now be heated to a temperature of from about 140° F. to 150° F., as shown by block 19 to facilitate the second separation process, represented by the block 20, which is preferably adjusted to recover a cream that has a higher fat content than the minimum standard for whipping cream required by law. Since the latter is generally about 30%, the separator 20 may be set to yield a cream containing about 32% of fat and will deliver 16 pounds of such a cream containing 11.8% of solids-not-fat, as indicated in the oval 21.

This cream may be conveniently thinned down to the required minimum standard by reintroducing some of the skim (oval 22) resulting from the second separation process 20. In chart Fig. 1 this standardizing operation is represented by the block 23 with the subsequent oval 24 showing the final product as testing 30% of fat and 12.1% of solids-not-fat.

The cream has now the proper composition and character required in accordance with the present invention to withstand the high temperatures of the sterilization process without coagulation, and to keep in sealed containers for extended periods of time without visible fat separation and without developing tallowy flavors or unsightly discoloration. However, milk or cream subjected to a relatively limited amount of heat before sterilization has the tendency to congeal into a plastic gel after a short time of storage (so-called age thickening) and while the causes for this phenomenon are not entirely understood, a supplementary heat treatment prior to the sterilization process is known to prevent this undesirable change in the texture of canned milk products. Therefore, the cream prepared in accordance with the present invention may now be subjected to temperatures from about 190° to 220° F. for a period of from about 10 to 30 minutes depending upon the temperature employed, before it is passed on to the actual sterilization process.

If this preventive heat treatment is applied to the cream in bulk in steam-jacketed kettles or tubular heaters of suitable construction, the required temperatures may quickly be established without particular precaution, but if the treatment is applied after the cream has been filled into cans, as will generally be more convenient, the temperature should be raised gradually, in order to prevent the formation of coagulated milk deposits on the interior surface of the cans (so-called "burn-on").

In the preferred process illustrated in Fig. 1 the cream is first filled into the containers as indicated by the block 25. These containers are preferably plain or enamel lined sanitary type tin cans which may have a capacity of six ounces each and the cream may be packed into these containers in hot or cold condition. However, it is important that the final product in the sealed cans is under a vacuum to prevent inclusion of oxygen in the cans which would oxidize the cream fat and might thus promote the formation of tallowy flavors. Thereafter, the filled cans are introduced into a suitable heating chamber wherein their temperature is gradually raised to about 215° F.; at this level the cans are held for a period of about 10 minutes, as indicated in block 26. The exact temperature and the time of exposure to said temperature will, of course, vary depending upon the size of the containers, the nature of the initial ingredients and the previous heat treatments employed in preparing the product.

After the described heat treatment to prevent age thickening, the cans are ready for the sterilization process. While any sterilization method may be employed which subjects the cans to a heat treatment of sufficient intensity and duration to render the can contents thoroughly sterile, it is preferable to use a high-short sterilization method, i. e., a sterilization method applying a high temperature over a short period of time, since long exposure to the temperatures of the sterilization process has the tendency to cause gradual discoloration of the cream. Such short time high temperature sterilization methods, however, may cause "burn-on" in the cans and for this reason the preheater, sterilizer, and cooker described in the copending patent application of Paul C. Wilbur, Ser. No. 614,234 for Method and Apparatus for Heat Treating Evaporated Milk, filed September 4, 1945, now Patent No. 2,536,115, patented January 2, 1951, is of special advantage in sterilizing cream prepared in accordance with the present invention.

The preheater is preferably composed of a sequence of compartments each containing a heating medium which consists of a predetermined mixture of steam and non-condensable gas, such as air, with the heating media in consecutive compartments being of successively higher temperatures, such as shown and described in the copending application of Paul C. Wilbur, Ser. No. 698,413, for Method and Apparatus for Heat Treating Food and Food Products, filed September 21, 1946, now Patent No. 2,536,116, patented January 2, 1951. During operation, the cans are advanced through said compartments entering the compartment of lowest temperature first and due to the presence of air in the heating medium, the cans are heated at a rapid, yet properly controlled, rate such that cans entering the preheater at room temperature may be raised to the temperature prevailing at the exit portal thereof within a very brief period of time without the appearance of "burn-on" in their interior.

In the preferred embodiment of the invention illustrated by chart Fig. 1, the sterilization process is represented by the subdivided block 27, and the temperature at the entrance portal of the preheater may be set to 220° F., as indicated in section 28 of the block 27, while the temperature at the exit portal thereof may be set to 238° F., as likewise indicated in section 28. Six-ounce cans filled with cream prepared in accordance with my invention may be passed through the preheater 28 in as short a time as 9 minutes, and during this brief period will heat up to a temperature closely approaching the temperature prevailing at the exit portal without exhibiting any harmful effects. From the preheater the cans are passed into the sterilizer proper represented by the section 29 of the block 27. The temperature in the sterilizer may be as high as 254° F. requiring an exposure of only 6 minutes for the cream in the cans to be properly sterilized. Thus, since the temperature differential between the interior of the sterilizer proper and the contents of the cans, as they emerge from the preheater, is less than 25° F., the danger of coagulation during sterilization is reduced to a minimum. Hence, the Wilbur arrangement provides rapid, yet innocuous preheating of the cans to a temperature level which permits safe transfer of said cans into a sterilizer of such high temperatures as will reduce the actual sterilization period to a matter of a few minutes. In this manner the Wilbur sterilizer reduces the total sterilizing process to a minimum of time without detrimental effects upon the product or its containers. Upon leaving the cooker 29, the cans are passed into the cooler symbolized by the section 30 of the block 28, wherein they are cooled to a temperature of 80° F. or below.

The canning process is now complete and the cans may be stored away for later use. While the cream will keep for many weeks when the cans are stored at room temperature, it is preferable to store them at temperatures of 50° F. or below (block 31). Such temperatures increase the viscosity of cream produced in accordance with the invention and thus act as an added safeguard against fat separation. In addition low storage temperatures will inhibit even such slight discoloration as may occur upon prolonged storage at room temperature. When the cans are opened for consumption, the cream will resemble freshly pasteurized cream in flavor, taste, and appearance far more closely than creams canned by previous methods, and as the product assumes room temperature its fluidity will quickly return to normal with no visible fat separation. There will be no tallowy flavors and the cream will readily whip when chilled, no matter how long it has been stored.

While the described process for preparing whipping cream employs a milk concentrate 13, produced from whole milk, as one of the constituents of the blend 18, it is, of course, possible to arrive at about the same composition by producing the evaporated milk constituent from skimmed milk, as illustrated in Fig. 2. In this chart the oval 40 represents a whole milk that may be identical with the milk 10 employed in the process of chart Fig. 1. In the alternative process, however, this milk is conducted directly into a separator 41 adjusted to yield a cream containing 20% of fat and 7.5% of solids-not-fat as symbolized by the oval 42 with the resultant skim containing 9.4% of solids-not-fat and about 0.1% of fat as indicated in the oval 43. The skim 43 is forewarmed and evaporated, as indicated by the blocks 44 and 45, respectively, which correspond to the blocks 11 and 12 of chart Fig. 1, to yield a skim concentrate containing 31.5% of solids-not-fat and only 0.3% of fat as shown in oval 46. This skim concentrate is blended with an appropriate quantity of the 29% cream to arrive at a composition coresponding to the composition 18 in chart Fig. 1. Due to the lack of fat in the skim concentrate 46 as compared with the whole milk concentrate 13, of the previously described process, a greater amount of the cream 42 is required to arrive at about the same composition so that two and one quarter parts of the cream 42 have to be mixed with only one part of the skim concentrate 46 as indicated in the block 47. From here on the process may be continued in exactly the same manner as represented by the stations 19 to 31 of chart Fig. 1.

Although the present invention is of primary utility in preparing and preserving sterilized whipping creams in such a manner as to practically eliminate the danger of fat separation while leaving their whipping quality unimpaired, the process of the present invention may be employed with excellent results in preparing preserved table creams. As a rule table creams are not expected to whip well; they are usually of a lesser fat content than the whipping creams in order to pour well, and homogenization is capable of greatly improving their marketability by rendering them more stable to fat separation without the necessity of increase in viscosity. Homogenization however, does increase the possibility of coagulation during the sterilization process and in the preparation of preserved table creams the present invention, therefore, provides for added heat treatment to compensate for the decrease in heat stability resulting from homogenization, and/or places the homogenization treatment at a point of the production process where it will least affect the heat stability of the cream.

Fig. 3 illustrates the production process of the present invention as modified to prepare a sterilized table cream. A whole milk may again serve as raw material and may contain 3.8% of fat and 8.7% of solids-not-fat as indicated in oval 50. It will be understood that this specific composition is in no way critical and with certain self-evident adjustments in the evaporation, separation, and blending processes, depending upon the ratio of fat to solids-not-fat in the initial material, the method of the present invention may start out with any high grade milk and will yield creams of the same or similar compositions and the same excellent keeping quality as are obtained from a milk of the above specified composition.

A quantity of the milk 50 is forwarmed at temperatures above 180° F., such as 195° F., as indicated by the block 51 which corresponds to the block 11 of chart Fig. 1, and is then evaporated at some suitable temperature, such as 145° F. (block 52), until a selected milk concentrate is obtained containing, for instance, 26.3% of total solids composed of 8% of fat and 18.3% of solids-not-fat (oval 53). Another lot of the milk 50 has meanwhile been separated (block 54) to provide a cream containing, say, 20% of fat and 7.3% of solids-not-fat (oval 55), and predetermined proportions of the milk concentrate 53 and the cream 55, for instance, 1.2 parts of the milk concentrate for every part of the cream, are blended at 56 to yield a mixture 57 containing 13.4% of fat and 13.3% of solids-not-fat.

In preparation for the homogenizing treatment, the mixture 57 is now subjected to a heat treatment at a temperature of at least 180° F. which may last from about 1 to 10 minutes, as indicated in block 58. The most suitable temperature and time of exposure to said temperature will vary depending upon the pressures employed in the subsequent homogenization process, and should preferably be determined by a series of plot tests. Upon completion of the described heat treatment the mixture is cooled to a temperature most suitable for the directly succeeding separation process, such as 150° F. (block 59), whereupon it is processed in a separator 60 that may be set to yield a cream having a fat content in excess of the required minimum standard. Assuming said minimum standard to be 20%, the separator 60 may be set to yield a cream containing say 22% of fat, as indicated in the oval 61. This cream may be thinned out to the desired standard by reintroduction of some of the skim 62 resulting from the separation process 60 (block 63), whereupon it has the desired composition containing, for instance, 20% of fat and 12.3% of solids-not-fat, as indicated in the oval 64.

The cream may now be processed in a suitable homogenizer, as indicated by the block 65, and due to its composition and the above described treatments, pressures not exceeding 2000 pounds and as low as 1500 pounds will be sufficient to secure appropriate fluidity and adequate security against fat separation. Thereafter, the cream may be filled into cans, may be subjected to an additional heat treatment to guard against age thickening and may be sterilized and stored away in the manner indicated by the stations 25 to 31 of the initially described method of preparing a sterilized whipping cream. Table cream thus prepared will not coagulate during the sterilization process and will keep for many months in excellent condition resembling closely a freshly pasteurized high-grade table cream whenever the cans are opened for consumption.

However, cream produced from certain types of milk may be prone to form coagulation patterns known as "feathering" when quickly poured into hot coffee or tea, especially if higher homogenization pressures than those stated above should have been employed in its manufacture.

This undesirable behaviour of the finished product may be overcome by moving the homogenization treatment to a point prior to one, or both, of the separation processes that may be involved in the production method of the present invention; in other words, the homogenization process is applied to the ingredient or ingredients from which the cream is made, rather than to the cream itself. An illustrative example of this modified form of the present invention is represented in Fig. 4.

Here again the process of the invention commences with a raw whole milk, as indicated by the oval 70, which is first subjected to the repeatedly discussed forewarming process at temperatures of 180° F. or above over a period of about 1 to 10 minutes (block 71). Upon completion of the forewarming process the milk may be cooled to a suitable temperature between 135° and 165° F., say 150° F., as indicated by the block 72, at which it is processed in a homogenizer 73 at pressures of the order of 1500 pounds. The homogenized milk is conducted into the separator 74 where it is divided in to a cream 75 of a desired fat content, say 20%, and the corresponding skim 76 which may contain 9% of solids-not-fat and approximately 0.7% of fat. This skim is condensed by evaporation (block 77) into a skimmed milk concentrate 78 that may contain 20.5% of total solids composed of 19% of solids-not-fat and 1.5% of fat, as shown in oval 78. Appropriate quantities of the skim concentrate 78 and the cream 76 are now blended to yield a composition from which a table cream combining a desired fat content with at least 10% of solids-not-fat may be separated. In the exemplary process illustrated in Fig. 4 the skim concentrate 78 and the cream 76 are blended in a ratio of 1.3:1 (block 79) to yield a composition containing 9.6% of fat and 13.9% of solids-not-fat as indicated in the oval 80. This mixture is adjusted to a suitable temperature of about 100° to 180° F. for separation, say 150° F. (block 81), and is then processed in a separator 82 which may be set to yield a cream of, say, 22% fat that will automatically contain about 12% of solids-not-fat. From this point on all further process steps, such as proper standardization, heat treatment to prevent age thickening, filling into cans, and sterilization may be carried out in the same manner as previously discussed, and will yield a product that does not only keep in excellent condition over prolonged periods of storage but, in addition, will readily blend with hot coffee or tea without forming any objectionable coagulation patterns.

Any explanations as to why the described transposition of the homogenization process to a point before separation lessens its harmful effect upon the heat stability of cream, are necessarily somewhat hypothetical. In general, the tendency of homogenization to lower the heat stability of milk or cream is believed to be caused by the vast increase in fat surfaces resulting from the subdivision of the fat globules, which withdraw quantities of anti-coagulants by absorption from the serum and thus render it less stable. When homogenization is carried out before separation, the resultant loss in anti-coagulants occurs at a phase of maximum supply and is, therefore, least harmful, but when homogenization is applied after a great portion of the serum has been removed by separation, practically the same quantity of anti-coagulants is withdrawn from a much smaller quantity of serum so that the heat stability of the product is now far more seriously impaired than in the former case.

While I have explained the present invention and the manner in which it is to be performed with the aid of several specific embodiments thereof, it will be understood that neither its products nor the ingredients from which they are made need be of the specific composition stated by way of example; nor are the described treatments and process steps limited to the exemplary temperatures, times of exposure, or pounds of pressure stated in the specification or noted in the charts, all of which may vary considerably depending upon the nature of the original ingredients and the desired composition and purpose of use of the final product as has repeatedly been pointed out hereinbefore. Furthermore, it is by no means necessary that the primary creams involved in the process of the present invention be derived from the same milk from which the milk or skim-concentrates employed by this invention are made; said creams may be made from entirely different milks and may, in fact, be bought in fresh or pasteurized form from entirely different and independent sources. Also, while I have disclosed a method of preparing a whipping cream for preservation in sealed containers that does not require homogenization to effectively resist fat separation over extended periods of storage, it will be understood that homogenization, especially at moderate pressure, may be employed in its manufacture, if so desired, without departing from the scope and spirit of the present invention. It should also be understood that wherever the following claims call for a raw or a natural cream or a cream in its raw or natural condition, these terms are understood to include pasteurized cream.

Having thus explained the present invention, what I claim is:

1. The process of preserving a cream in sealed containers, which comprises forewarming a quantity of milk, evaporating said forewarmed milk to form a predetermined concentrate, blending said concentrate with a primary cream in natural condition in proportions permitting subsequent separation to yield a cream ranging in fat content from 15 to 35% and containing at least 10% of solids-not-fat, separating from the resultant mixture a secondary cream of a desired fat content within the stated range, and thereafter sterilizing said cream in sealed containers.

2. The process of canning a whipping cream which comprises subjecting a quantity of milk to temperatures of at least 180° F. for a period of time ranging from 1 to 10 minutes, thereafter evaporating said milk to a desired degree of concentration, blending the resultant concentrate with a primary cream in natural condition in predetermined proportions enabling subsequent separation to yield a cream combining a fat content of the order of 30% with at least one-third of said quantity in solids-not-fat, separating a secondary cream of said fat content from the resultant mixture, filling said secondary cream into containers, sealing said containers, and subjecting said sealed containers to a sterilizing heat treatment.

3. The process of preserving a whipping cream in sealed containers which comprises forewarming a quantity of milk at a temperature of the order of 195° F. for a period of about 10 minutes, concentrating said forewarmed milk to about half its original volume, blending the resultant concentrate with a primary cream in natural condition of a fat content of the order of 20%, separating from the resultant mixture a secondary cream having a fat content of the order of 30% and containing at least one-third of said quantity of solids-not-fat, filling said secondary cream into sanitary containers, subjecting the filled containers to sterilization temperatures of the order of 250° F. for about six minutes, and thereafter storing said containers at temperatures not exceeding 50° F.

4. The process of canning a table cream, which comprises forewarming a quantity of milk, evaporating said forewarmed milk to a desired degree of concentration, blending the resultant concentrate with a primary cream in natural condition in quantities proportioned to permit subsequent separation to yield a cream combining a desired fat content with at least 10% of solids-not-fat, subjecting the resultant mixture to temperatures of at least 180° F., separating from said mixture a secondary cream of said desired fat content and having at least 10% of solids-not-fat, homogenizing said secondary cream at pressures not exceeding 2000 pounds, and thereafter sterilizing the homogenized cream.

5. The process of preserving a table cream in sealed containers which comprises forewarming a quantity of milk at a temperature of the order of 195° F., evaporating said milk to about half its original volume, blending the resultant concentrate in predetermined proportion with a primary cream in natural condition containing about 20% of fat, subjecting the resultant mixture to another forewarming process at temperatures of at least 180° F., cooling said mixture to a temperature of the order of 150° F., separating from said mixture a secondary cream of a desired fat content and containing at least 10% of solids-not-fat, homogenizing said secondary cream at pressures ranging from 1500 to 2000 pounds, filling said homogenized cream into said containers under a vacuum, sealing said containers, subjecting the sealed containers to a sterilizing heat treatment and thereafter storing said cans at temperatures of the order of 50° F. and below.

6. The process according to claim 5 wherein said containers are subjected to a sterilizing temperature of the order of 250° F. for about six minutes.

7. The process of preparing a cream for preservation in sealed containers which comprises forewarming a quantity of milk at temperatures of at least 180° F., cooling said milk to about 150° F., homogenizing said milk at pressures not exceeding 2000 pounds, separating said milk into a skim and a primary cream of a fat content of the order of 20%, evaporating said skim to a desired degree of concentration, blending the resultant concentrate with said primary cream in proportions enabling renewed separation to yield a secondary cream combining a desired fat content with at least 10% in solids-not-fat, adjusting the resultant mixture to a temperature of the order of 150° F., and separating therefrom a secondary cream of said desired fat content.

VICTOR NELSON.

REFERENCES CITED

The following references are of record in the file of this patent:

UNITED STATES PATENTS

| Number | Name | Date |
|---|---|---|
| 1,791,068 | Wendt | Feb. 3, 1931 |
| 2,121,896 | Wendt | June 28, 1938 |

OTHER REFERENCES

U. S. Dept. of Agriculture Circular 549, cited, page 33.

U. S. Dept. of Agriculture Circular 549, June 1940, pages 41–57.

"Proximate Composition of American Food Materials," published by U. S. Govt. Printing Office, Washington, D. C.